June 3, 1924.
A. B. SEPPMANN
1,496,383
ELECTRICAL SPARK PLUG SHORTING DEVICE
Filed April 4, 1923
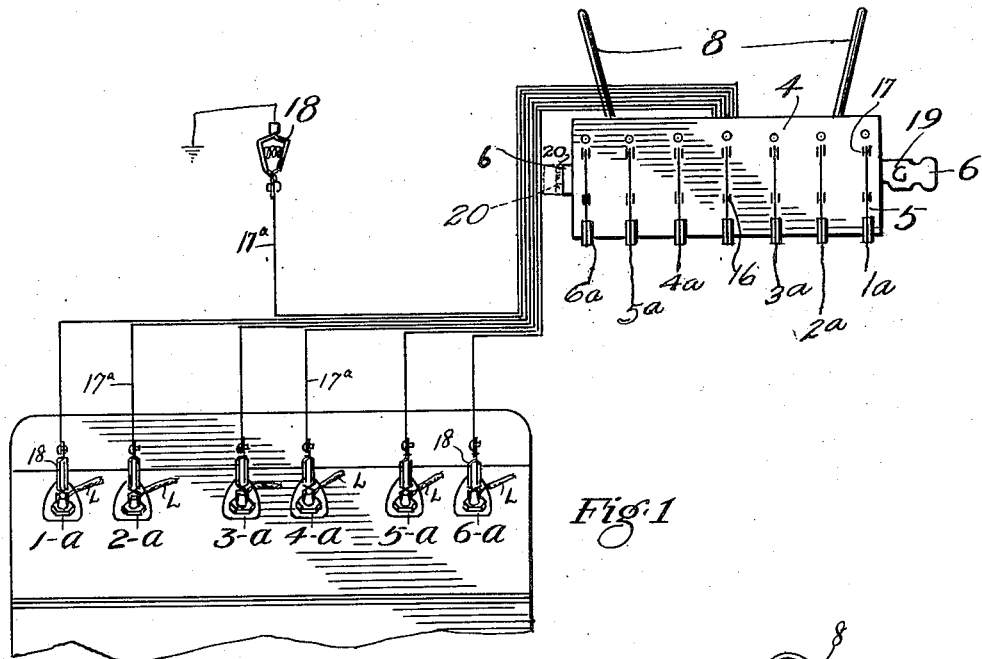
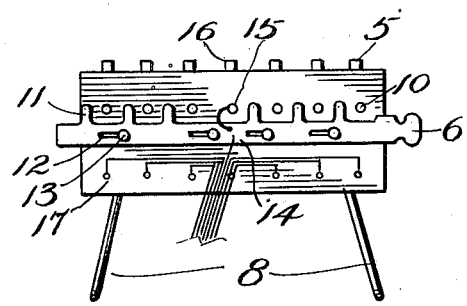
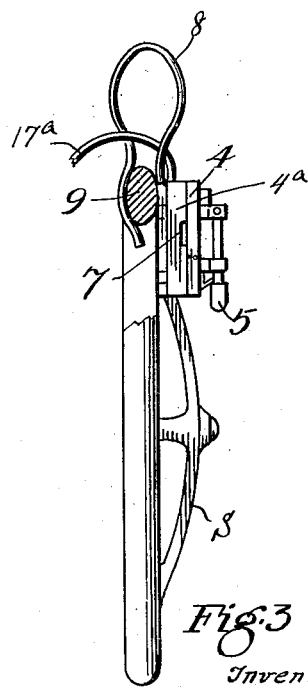
Inventor
A.B. Seppmann
By Watson E. Coleman
Attorney Patented June 3, 1924.

1,496,383

UNITED STATES PATENT OFFICE.

ALFRED BRUNO SEPPMANN, OF LAKE CRYSTAL, MINNESOTA.

ELECTRICAL SPARK-PLUG-SHORTING DEVICE.

Application filed April 4, 1923. Serial No. 629,828.

*To all whom it may concern:*

Be it known that I, ALFRED B. SEPPMANN, a citizen of the United States, residing at Lake Crystal, in the county of Blue Earth and State of Minnesota, have invented certain new and useful Improvements in Electrical Spark-Plug-Shorting Devices, of which the following is a specification, reference being had to the accompanying drawings.

This invention relates to testing devices and more particularly to a device for testing the engines of automobiles and the like.

An important object of the invention is to provide means for testing an engine by shorting the spark plugs thereof, and including means whereby either all of the spark plugs of the engine, with the exception of a selected plug, may be simultaneously shorted or a single selected plug may be shorted as desired.

A further object of the invention is to provide a device of this character which may be conveniently mounted so that it may be operated by a mechanic seated at the steering wheel of an automobile, thereby permitting testing of the engine while under load or under actual road conditions, it being well-known to those familiar with the art that irregularity in the operation of the engine noticeable while the engine is under load may be impossible of detection while the engine is idling.

A further object of the invention is to provide a device of this character which not only serves as a means for shorting the plugs to locate trouble in the engine, but which may likewise be employed as a testing device to determine whether or no the gaps of the spark plugs are properly spaced.

These and other objects I accomplish by the construction shown in the accompanying drawings, wherein for the purpose of illustration is shown a preferred embodiment of my invention and wherein like reference characters designate like parts throughout.

In the drawings:—

Figure 1 is a front elevation partially diagrammatic, showing a testing device constructed in accordance with my invention, connected for testing an engine;

Figure 2 is a rear elevation thereof, mounting blocks being removed; and

Figure 3 is a side elevation thereof showing the same applied to the steering wheel of an automobile.

Referring now more particularly to the drawings, the numeral 4 designates a suitable panel having mounted upon the front face thereof a plurality of single blade, single throw switches 5. The blade pivot end 17 of the switches is in each instance connected with a cable 17ª, having at its free end an attaching clip 18 of the type commonly employed for connecting the storage battery leads of the storage battery and generally known as a charging clip. The contacts of the blade switches are extended through the opposite face of the panel and form contact points 10 for engagement by resilient fingers 11, carried by a bar or gang switch 6.

The switches 5 are at least one in excess of the number of cylinders of the engine to be tested and the contact 15 of this excess switch, generally designated at 16, is electrically connected with the reciprocatory bar 6 and with the fingers thereof. The bar 6 has slotted openings 12 formed therein, through which extend headed elements 13, forming a mounting for the bar by means of which it may be shifted to bring the fingers 11 into engagement with the contacts 10 of the remainder of the switches and accordingly to electrically connect each of these contacts with the bar 6. This bar is provided upon that face thereof opposing the panel 4 at one end with a symbol 19, designating when exposed that connection has been made between the bar and the switches contacts 10, and upon the opposite end with indicia 20, indicating when exposed that this contact is broken. The panel is provided with any suitable mounting 4ª, which mounting includes a pair of spring clamp arms 8, adapted to clampingly engage the rim 9 of the steering wheel S, so that the assemblage may be readily mounted upon the steering wheel of the vehicle and be handy for manipulation by a person driving the vehicle.

In the use of the device the same is mounted upon the steering wheel and the clip 18 of the lead 17ª from the ground switch 16 is engaged with some metallic part of the machine. The clips of the remaining leads 17ª, which are numbered substantially as indicated to correspond to the corresponding switches, are engaged with the central electrode of the spark plugs of the engine, the usual leads L of these spark plugs being connected in the usual manner. Assuming that it is desired to locate a cylinder which is missing when the vehicle is under load with the car in operation, the mechanic engages all of the switches but one, for example, that switch generally designated at 1ª and corresponding to the first cylinder of the engine. The gang switch 6 is then placed in the "On" position with the result that all of the spark plugs with the exception of that one, the switch of which is elevated, are simultaneously shorted, for the reason that they are each electrically connected with the bar 6 and this bar is in turn electrically connected with the switch 16 and through the switch 16 to the ground. If the cylinder tested is found to be in operation the switch 1ª is closed and the switch 2ª opened and the test thus proceeded with until the missing cylinder is located. It will be seen that this test may be made without stalling the engine since a temporary cut off of all of the cylinders but the one being tested may be momentarily made and the inertia of the car while in motion will keep the engine in operation during such a limited period. When it is desired to locate a fault in the engine, which is only present when an explosion occurs in the engine and in a particular cylinder in which the fault lies, as for an example, a sticky exhaust valve or a piston slap, this is accomplished by disengaging all of the switches from 1ª to 6ª inclusive, the ground switch 16 being left closed and the gang switch 6 moved to the on position. Since the switches are all open none of the spark plugs are shorted and a single cylinder at a time may be tested by closing down the switch representing the desired cylinder and corresponding with it in number. By proceeding in regular order through the switches the faulty cylinder may be readily determined. When it is desired to use the device to test the spark plugs to determine whether or no the points thereof are properly spaced, this test may be made by disengaging all of the switches from 1ª to 6ª and placing the gang switch in a contact position, the switch 16 being left engaged. The switch corresponding to the plug to be tested is then moved toward its contacts but left spaced therefrom a distance of, for example, 3/64", a distance greater than the proper distance between the terminals of the spark plug. If a spark closes the gap between the switch blade and its contacts this will indicate that the plug points are either too far apart. If no spark appears at this time the switch is moved more closely into engagement and within the distance at which the spark plug points are properly spaced. If a spark does not appear at this time it will indicate that the plug points are either too close together or shorted in some manner or that the plug is foul, in any case indicating that attention to that particular plug is necessary.

From the foregoing it will be seen that these testing operations may be readily performed and without danger of receiving unpleasant shocks, such as are commonly met with in attempting a test of this character by shorting the plugs of the engine by the use of screw drivers or the like. This structure has been found particularly advantageous in locating trouble on light six, high speed motors, the bore of which is usually very small and the impulse rather light, thus rendering it difficult to distinguish by sound the missing cylinder by shorting a single plug at a time. By the use of my device all of the cylinders but one can be cut out instantly and positively for a short period of time and without danger of stalling the motor. It will be obvious that a device of this character is capable of a considerable range of modification without materially departing from the spirit of my invention and I accordingly do not limit myself to such specific structure as herein set forth, except as hereinafter claimed.

I claim:—

1. In a device of the type described, a suitable support, a plurality of switches mounted upon the support, flexible leads connected with corresponding terminals of the switches and each provided at an end thereof with a connector and means for connecting the other terminals of all of the switches but one to one another and to the corresponding terminal of the remaining switch, comprising a bar electrically connected with the terminal of the last named switch and having contact fingers engaging the last named terminals of the remaining switches when the bar is shifted in one direction.

2. In a device of the type described, a suitable support, a plurality of switches mounted upon the support, flexible leads connected with corresponding terminals of the switches and each provided at an end thereof with a connector and means for connecting the other terminals of all of the switches but one to one another and to the corresponding terminal of the remaining switch, comprising a bar electrically connected with the terminal of the last named switch and having contact fingers engaging the last named terminals of the remaining switches when the bar is shifted in one direction, and means for attaching said support to the steering wheel of an automobile.

3. In a device of the type described, a panel having a plurality of single blades, single throw switches mounted thereon, flexible leads connected with corresponding terminals of all of said switches, each of the flexible leads being provided upon its free end with a terminal clamp, a bar of conducting material slidable upon the rear face of the panel and electrically connected with the other terminal of one of the switches, said bar being provided with a plurality of contact fingers electrically engaging the remaining terminals of the remaining switches when the bar is shifted in one direction.

In testimony whereof I hereunto affix my signature.

ALFRED BRUNO SEPPMANN.